US005978873A

United States Patent [19]

Phan

[11] Patent Number: 5,978,873

[45] Date of Patent: Nov. 2, 1999

[54] COMPUTER SYSTEM INCLUDING RIGHT ANGLE PROCESSOR AND ADD-ON CARD CONNECTORS

[75] Inventor: Truong Phan, Hillsboro, Oreg.

[73] Assignee: Intel Corporation, Santa Clara, Calif.

[21] Appl. No.: 08/936,857

[22] Filed: Sep. 24, 1997

[51] Int. Cl.[6] .............................. G06F 13/00; H01R 9/09

[52] U.S. Cl. .......................... 710/101; 710/100; 710/103; 710/104; 710/126; 710/127; 439/79; 439/95; 439/567; 439/607; 439/695

[58] Field of Search .................................... 395/280, 281, 395/284, 306, 307, 283; 439/79, 695, 607, 567, 95; 339/19; 710/100, 101, 104, 126, 127, 103

[56] References Cited

U.S. PATENT DOCUMENTS

| | | | |
|---|---|---|---|
| 4,548,453 | 10/1985 | Mummey et al. | 339/17 |
| 4,632,495 | 12/1986 | Furman | 339/210 |
| 4,857,017 | 8/1989 | Erk | 439/695 |
| 5,038,308 | 8/1991 | Le et al. | 364/708 |
| 5,104,326 | 4/1992 | Smith et al. | 439/95 |
| 5,147,220 | 9/1992 | Lybrand | 439/567 |
| 5,236,375 | 8/1993 | Kachlic | 439/607 |
| 5,688,130 | 11/1997 | Huang | 439/79 |
| 5,807,119 | 9/1998 | Baechtle et al. | 439/79 |
| 5,822,551 | 10/1998 | Crane, Jr. et al. | 395/307 |
| 5,823,795 | 10/1998 | Schumacher | 439/76.1 |
| 5,833,475 | 11/1998 | Mitra | 439/79 |

*Primary Examiner*—Ayaz R. Sheikh
*Assistant Examiner*—Frantz Blanchard Jean
*Attorney, Agent, or Firm*—Blakely, Sokoloff, Taylor & Zafman LLP

[57] ABSTRACT

A computer system is formed using a right angle processor connector assembly and a right angle add-on card connector. The right angle processor connector assembly includes a right angle processor connector and a complementary support member. Each of the right angle processor package and add-on card connectors includes an L-shaped body having an inner cavity defined a number of inner walls extending from one end to the other end. Each connector is mechanically attached to a motherboard, upside down and in a direction orthogonal to the motherboard. Each connector receives its constituent component (i.e. the processor package or the add-on card) through one end, with the constituent components and the motherboard occupying parallel planes. Each connector further includes a number of L-shaped pins disposed on the inner walls extending from one end through the other to electrically couple the constituent component to the motherboard. The processor connector further includes bracing features that cooperate with like features of the complementary support member to support the processor package.

9 Claims, 4 Drawing Sheets

COMPUTER SYSTEM INCLUDING RIGHT ANGLE PROCESSOR AND ADD-ON CARD CONNECTORS

BACKGROUND OF THE INVENTION

1. Field of the Invention

The present invention relates to the field of computer systems. More specifically, the present invention relates to the art of coupling a processor and add-on cards to a motherboard of a computer system.

2. Background Information

Microprocessor based personal computers are known in the art, including personal computers employing low profile form factors. Conventional low profile personal computers employ a riser card to facilitate coupling of an add-on card to a motherboard. The add-on card and the motherboard occupy parallel planes (as oppose to orthogonal planes in the case of the AT form factor), to provide the low profile. [Note that the AT form factor includes the desktop as well as the tower variation, where one is basically a 90 degree rotation of the other.] Conventional low profile personal computers suffer from a number of disadvantages. One of these disadvantages is the inability to place high performance components on the add-on cards, as the distance to the motherboard is too far to meet the signal requirements of the high performance components. An example of such high performance component is a Peripheral Component Interconnect (PCI) agent. Thus, an alternate approach that can achieves the low profile and at the same time accommodates the signal requirements of high performance components is desired.

Additionally, low profile personal computers traditionally have employed zero insertion force (ZIF) sockets to couple processors to the motherboards. Historically, the manner in which processors are coupled to the motherboards has not been an issue that needs to be addressed in achieving low profile, as the processors generally have a very low profile. However, recent advances in microprocessor have led to certain high performance microprocessors to employ a "cartridge" approach to packaging, and single edge card connector (SECC) technology to connect the processor packages to the motherboards. Because of the high performance nature of these processors, typically heat sinks with substantial masses have to be employed to dissipate the heat generated by these processors. The first generation SECC processor packages are coupled to the motherboards with the two components occupying orthogonal planes, as a result constraining the low profile that can be achieved. Thus, a new non-orthogonal approach to coupling these new high performance SECC processor packages and motherboards is desired.

SUMMARY OF THE INVENTION

A method for forming a computer system is disclosed. A right angle add-on card connector is attached to a motherboard in a direction orthogonal to the motherboard. An add-on card is then attached to the add-on card connector, with the add-on card and the motherboard occupying parallel planes. In one embodiment, the right angle add-on card connector is attached to the motherboard at a location proximately adjacent to a number of components attached to the motherboard, the right angle add-on card connector having a height sufficiently tall to allow the add-on card to clear these components.

A computer system formed using the above disclosed method is disclosed. The computer system includes a motherboard, a right angle add-on card connector, and an add-on card interconnected as disclosed. In one embodiment, the add-on card comprises a PCI agent required to be within a predetermined electrical distance from a PCI bus disposed on the motherboard.

A right angle add-on card for use to form the above disclosed computer system is disclosed. The connector includes an L-shaped main body having an inner cavity defined by a number of inner walls extending from an outward end to a bottom end, and a number of L-shaped pins disposed on the inner walls, extending from the outward end through the bottom end. The L-shaped main body is attached to a motherboard "upside down" in the disclosed orthogonal direction. The outward end receives the add-on card in the disclosed parallel manner. The pins electrically couple the add-on card to the motherboard.

A method for forming a computer system is disclosed. A right angle processor connector is attached to a motherboard in a direction orthogonal to the motherboard. A processor package is then attached to the processor connector, with the processor package and the motherboard occupying parallel planes. In one embodiment, a support member is also attached to an opposite end of the processor package to secure the processor package.

A computer system formed using the above disclosed method is disclosed. The computer system includes a motherboard, a processor package, a right angle processor connector, and a complementary support member, interconnected as disclosed.

A processor connector assembly for use to form the above disclosed computer system is disclosed. The processor connector assembly includes a right angle processor connector and a complementary support member. The right angle processor connector includes an L-shaped main body including an inner cavity defined by a number of inner walls extending from an outward end to a bottom end. The connector further includes a plurality of L-shaped pins disposed on the inner walls, extending from the outward end through the bottom end. The connector and the complementary support member further include bracing features disposed at their sides. The processor connector is attached to a motherboard, "upside down" in the disclosed orthogonal direction. The connector receives a processor package at the outward end in the disclosed parallel manner. The pins electrically couple the processor package to the motherboard. The braces cooperate to secure the processor package.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. Those skilled in the art will also appreciate that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Figure 1A:
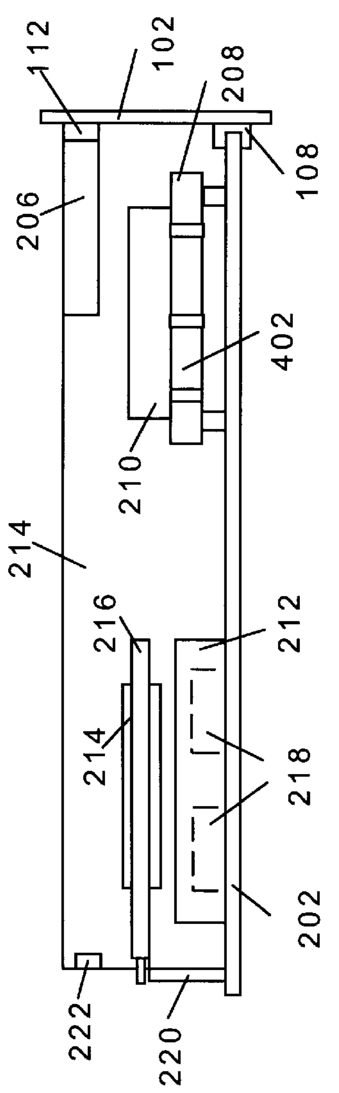
FIGS. 1a–1b illustrate a side view and a top view of an exemplary motherboard having a processor package and an add-on card attached thereto in accordance the teachings of the present invention.
Figure 1B:
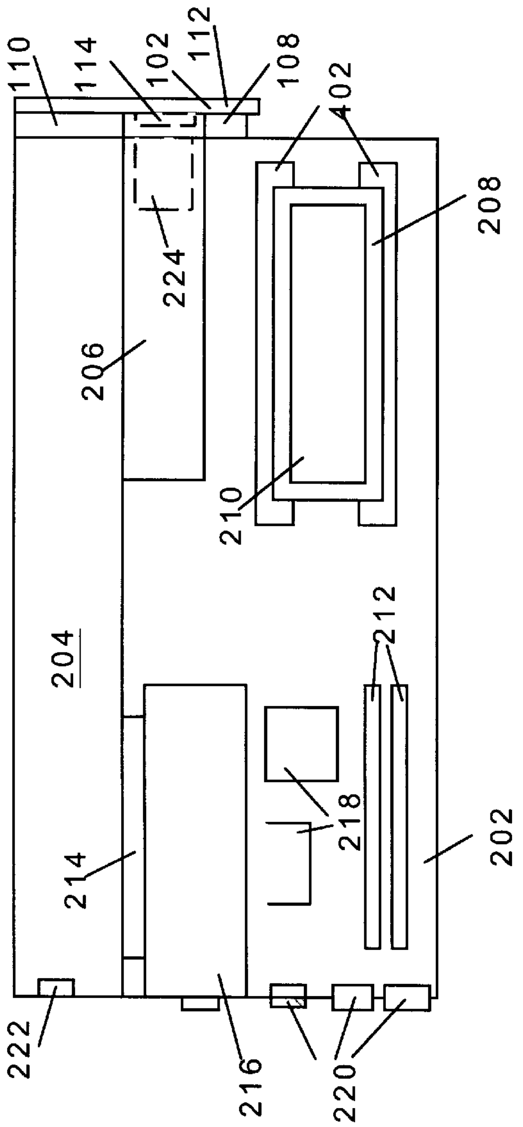

Referring now to FIGS. 1*a*–1*b*, wherein a side view and a top view of an exemplary motherboard having a processor package and an add-on card attached to it in accordance with the teachings of the present invention are shown. As illustrated, in accordance with the teachings of the present invention, processor package 208 and add-on card 216 are attached to motherboard 202 employing right angle processor connector assembly 402 and right angle add-on card connector 214 of the present invention respectively. Processor package 208 is a cartridge like package employing SECC technology, and has heat sink 210 attached to it. An example of processor package 208 is disclosed in co-pending U.S. patent application Ser. No. 08/739,815, filed on Oct. 30, 1996, entitled A Processor Card Assembly. An example of add-on card 216 is a Peripheral Component Interconnect (PCI) add-on card with a PCI agent disposed thereon. The PCI agent is to be coupled to a PCI bus disposed on motherboard 202, and having to meet the high performance PCI signal requirements.

Right angle processor connector assembly 402 includes a right angle processor connector and a complementary support member (FIG. 1*b*). The right angle processor connector is first attached to motherboard 202 in a direction orthogonal to motherboard 202. Processor package 208 with heat sink 210 is then attached to the right angle processor connector with processor package 208 and motherboard 202 occupying parallel planes. Similarly, right angle add-on card connector 214 is first attached to motherboard 202 in a direction orthogonal to motherboard 202. Add-on card 216 is then attached to right angle add-on card connector 214 with add-on card 216 and motherboard 202 occupying parallel planes.

In one embodiment, right angle add-on card connector 214 is sufficiently tall to allow a number of predetermined components 218 to be located proximately adjacent to connector 214, inside the exterior cavity defined by add-on card 216, right angle add-on card connector 214, and motherboard 202. Components 218 are intended to represent a number of integrated circuits (chips) commonly found attached to motherboards, such as digital signal processors (DSP).

In addition to processor package 208, add-on card 216, and components 218, motherboard 202 also has a number of other components attached to it, such as memory modules 212 and I/O ports 220. Examples of memory modules 212 includes single in-line memory modules (SIMM) or dual in-line memory modules (DIMM), whereas examples of I/O ports 220 include keyboard, mouse, serial and parallel ports.

For the illustrated embodiment, motherboard 202 including the above described elements is attached to riser card 102. Attached also to riser card 102 is power supply 204, fixed drive 206, and optionally, diskette drive 224. For the illustrated embodiment, power supply 204 spans the entire length of motherboard 202, and having receptacle 222 disposed at the other end to receive external AC power. In a preferred embodiment, riser card 102 includes a number of inter-component cabling elimination features disposed on its rear (interior facing) surface and its front (exterior facing) surface. The features disposed on the interior facing surface includes motherboard connector 108, power supply connector 110, fixed drive connector 112 and diskette drive connector 114 for directly connecting motherboard 202, power supply 204, fixed drive 206 and diskette drive 224 to riser card 102, without employing cabling. The features disposed on the exterior facing surface includes a power on/off button for powering the host computer system on/off, a number of I/O ports for coupling external I/O devices to the host computer system, visual indicators and display area for providing visual indicators and messages to a user of the host computer system. Riser card 102 is the subject of U.S. patent application Ser. No. 08/935,475, filed contemporaneously, entitled A Computer System Including A Riser Card With Multiple Inter-Component Cabling Elimination Features, as well as the subject of U.S. patent application Ser. No. 08/936,858, filed contemporaneously, entitled A Computer System Including A Riser Card And A Chassis With Serviceability Features, which are both hereby fully incorporated by reference.

Figure 2:
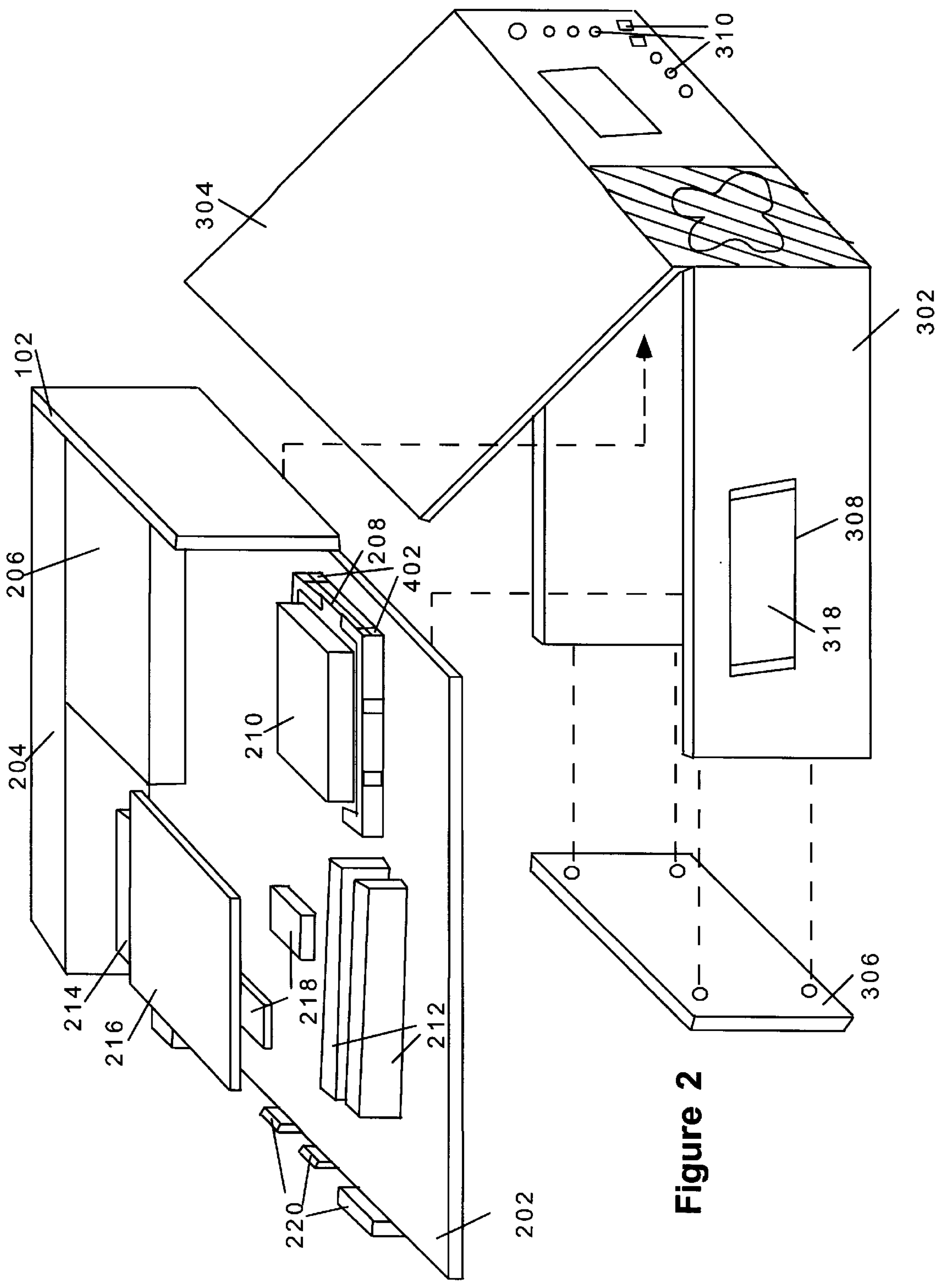
FIG. 2 illustrates how the interconnected components can be placed into a chassis to form a low profile computer system in accordance with one embodiment of present invention.

FIG. 2 illustrates in further detail how the interconnected components are placed into a chassis to form a low profile computer system in accordance with one embodiment of the present invention. The illustration is presented from a perspective view of the exemplary system. As illustrated, the interconnected elements, including motherboard 202, right angle processor connector assembly 402, processor package 208, right angle add-on card connector 214, add-on card 216 etc., are placed into chassis 302 to form exemplary computer system 400. The interconnected elements are placed into chassis 302 in a manner such that riser card 102 is disposed directly behind the front wall of chassis 302. For the illustrated embodiment, chassis 302 includes corresponding openings 310 disposed on the front wall to externalize the cabling elimination features disposed on the exterior facing surface of riser card 102. Furthermore, Chassis 302 includes hinged top cover 304 and back panel 306, which when assembled, render chassis 302 effectively sealed. An effectively sealed chassis is a chassis that requires special tool and/or extraordinary effort on the part of a use to open the chassis. However, sealed chassis 302 includes covered opening 308 with sliding cover 318, which can be slid in one direction to temporally uncover opening 308 to provide access to servicing components located proximately adjacent to opening 308, without requiring chassis 302 to be unsealed. Chassis 302 is the subject of the above identified incorporated by reference co-pending U.S. patent application Ser. No. 08/936,858.

As a result, exemplary computer system 400 can achieve a low profile, notwithstanding the fact that processor package 208 is a cartridge like package that employs SECC technology, such as the processor package disclosed in the above identified co-pending U.S. patent application Ser. No. 08/739,815. Also, add-on card 216 may contain high performance components that have signal requirements of certain maximum electrical distance from motherboard 202, such as the PCI add-on card example described earlier.

Figure 3:
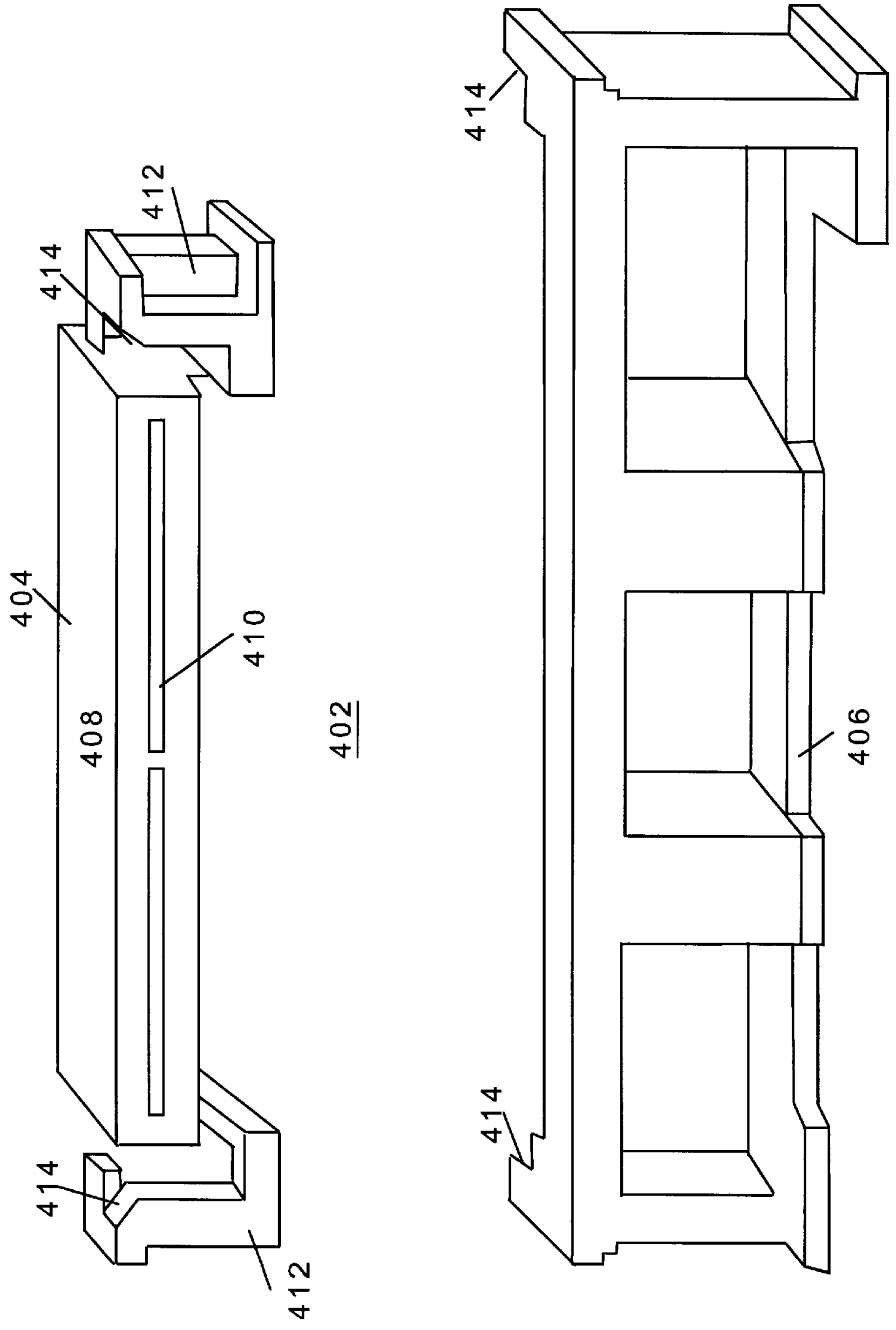
FIG. 3 illustrates one embodiment of the right angle processor connector assembly of the present invention.

FIG. 3 illustrates one embodiment of right angle processor connector assembly 402 in further detail. The illustration is presented from a perspective view of the assembly. As illustrated and described earlier, right angle processor connector assembly 402 includes right angle processor connector 404 and complementary support member 406. Right angle processor connector 404 includes L-shaped main body 408, when viewed upside down with motherboard 202 "on top". Alternatively, L-shaped main body 408 can be considered as being mounted "upside down" in the direction orthogonal to motherboard 202. The end of L-shaped body 408 that connects with motherboard 202 is referred to as the bottom end, whereas the other end is referred to as the outward end. L-shaped body 408 has inner cavity 410 defined by a number of inner walls, extending from the outward end to the bottom end. L-shaped body 408 also includes a number of L-shaped pins disposed on the inner walls, extending from the outward end through the bottom end. Additionally, L-shaped body 408 is augmented at both sides with mounting steps 412, which include bracing features 414 disposed at the top. Complementary member 406 also includes bracing features 414 of like kind.

Right angle processor connector 404 receives processor package 208 at the outward end, with processor package 208 and motherboard 202 occupying parallel planes. Processor package 208 is electrically coupled to motherboard 202 by the L-shaped pins disposed on the inner walls of L-shaped body 408. Additionally, processor package 208 is supported and secured by bracing features 414 disposed on mounting steps 412 of processor connector 404 and complementary support member 406.

Figure 4A:
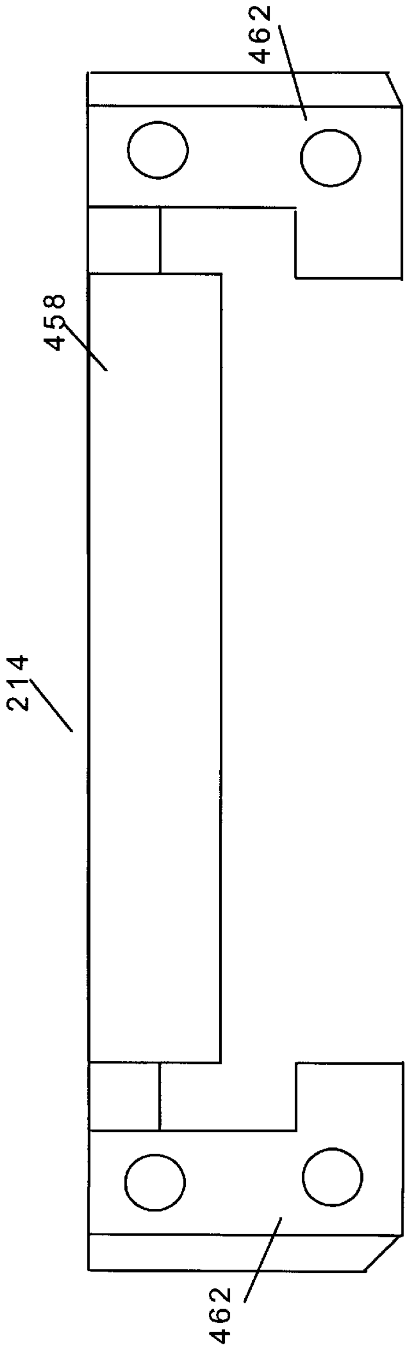
FIGS. 4a–4c illustrate a top view, a front view, and a side view of the right angle add-on card connector of the present invention.
Figure 4C:
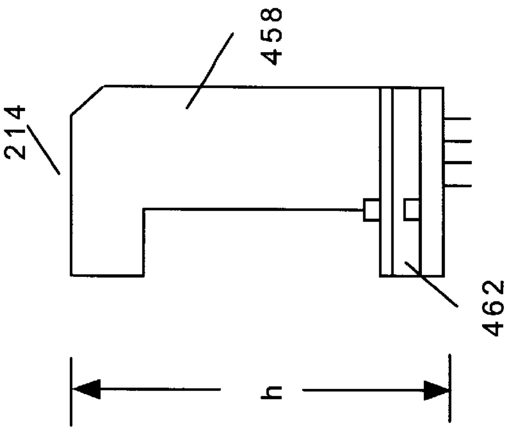
Figure 4B:
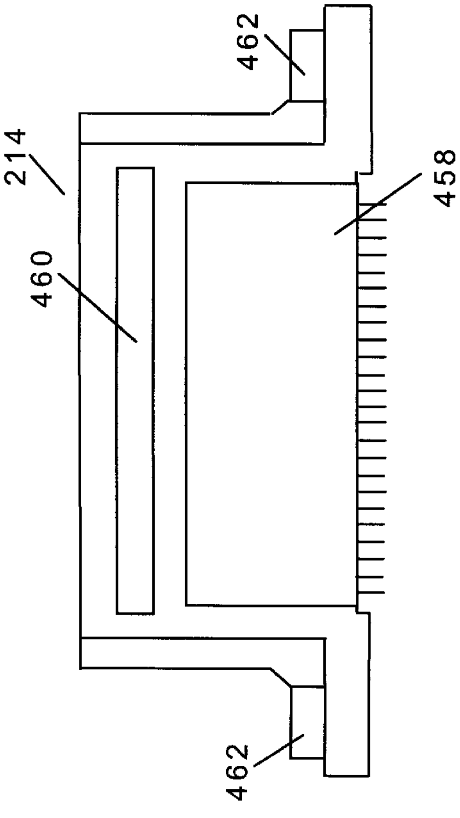

Referring now to FIGS. 4*a*–4*c*, wherein a top view, a front view, and a side view of one embodiment of right angle add-on card connector 214 are shown. As illustrated, right angle add-on card connector 214 also has an L-shaped main body 458, when viewed upside down with motherboard 202 on top. Alternatively, L-shaped main body 458 can be considered as being mounted "upside down" in the direction orthogonal to motherboard 202. L-shaped main body 458 is of sufficient height (FIG. 4*c*), such that the add-on card can clear the predetermined components located proximately adjacent to add-on card connector 214. In other words, the exterior cavity defined by add-on card 216, connector 214 and motherboard 202 can accommodate these proximately located components. The end of L-shaped body 458 that connects with motherboard 202 is also referred to as the bottom end, whereas the other end is referred to as the outward end. L-shaped body 458 has inner cavity 460 defined by a number of inner walls, extending from the outward end to the bottom end. L-shaped body 458 also includes a number of L-shaped pins disposed on the inner walls, extending from the outward end through the bottom end. Additionally, L-shaped body 458 is augmented at both sides with mounting steps 462.

Right angle add-on card connector 214 receives add-on card 216 at the outward end, with add-on card 216 and motherboard 202 occupying parallel planes. Add-on card 216 is electrically coupled to motherboard 202 by the L-shaped pins disposed on the inner walls of L-shaped body 458.

Those skilled in the art will appreciate that the disclosed invention may be practiced with modifications and alterations within the spirit and scope of the appended claims. Accordingly, the above description is to be regarded as illustrative but not restrictive of the present invention.

Thus, a computer system including right angle processor and add-on card connectors has been disclosed.

What is claimed is:

1. A processor connector assembly for coupling a processor package to a motherboard in a low profile manner, comprising:

a) a processor connector including
  a.1) an L-shaped main body, having an inner cavity defined by a plurality of inner walls extending from a first end to a second end, to be mechanically attached upside down to a motherboard with the upside down L-shaped main body and the motherboard being orthogonal to each other, and to receive the processor package at the first end with the processor package and the motherboard occupying parallel planes,
  a.2) a plurality of L-shaped pins disposed on the inner walls of the inner cavity extending from the first end through the second end to electrically connect the processor package to the motherboard,
  a.3) first bracing features disposed at first and second sides of the upside down L-shaped main body; and
b) a support member independent of and to be placed at a predetermined distance away from the processor connector, and having second bracing features that cooperate with the first bracing features of the processor connector to secure the processor package.

2. The processor connector as set forth in claim 1, wherein the L-shaped main body is augmented at its sides with mounting steps to facilitate said upside down mechanical attachment to the motherboard.

3. A computer system with a low profile, comprising:

a) a motherboard;
b) a processor connector assembly including
  b.1) a processor connector having
    b.1.1) a first L-shaped main body, including a first inner cavity defined by a first plurality of inner walls extending from a first end to a second end, mechanically attached upside down to the motherboard with the first upside down L-shaped main body and the motherboard being orthogonal to each other,
    b.1.2) a first plurality of L-shaped pins disposed on the first inner walls of the first inner cavity, extending from the first end through the second end, and electrically connected to the motherboard, and
    b.1.3) first bracing features disposed at first and second sides of the first upside down L-shaped main body, and
  b.2) a support member independent of and to be placed at a predetermined distance away from the connector, and having second bracing features that cooperate with the first bracing features of the processor connector; and
c) a processor package engaged with the first inner cavity of the processor connector with the processor package and the motherboard occupying parallel planes, electrically coupled to the motherboard through the first plurality of L-shaped pins, and mechanically supported by the first and second bracing features of the processor connector assembly.

4. The computer system as set forth in claim 3, wherein the first L-shaped main body of the processor connector is augmented at its sides with mounting steps to facilitate said upside down mechanical attachment to the motherboard.

5. The computer system as set forth in claim 3, wherein the computer system further comprises:

d) an add-on card connector including
  d.1) a second L-shaped main body, including a second inner cavity defined by a second plurality of inner walls extending from a third end to a fourth end, to be mechanically attached upside down to the motherboard with the upside down L-shaped main body and the motherboard being orthogonal to each other, d.2) a second plurality of L-shaped pins disposed on the second inner walls of the second inner cavity extending from the third end through the fourth end to be electrically connected to the motherboard, and e) an add-on card mechanically engaged with the second inner cavity at the third end of the add-on card connector with the add-on card and the motherboard occupying parallel planes, and electrically coupled to the motherboard through the second plurality of L-shaped pins.

6. The computer system as set forth in claim 5, wherein the second L-shaped main body of the add-on card connector is augmented at its sides with mounting steps to facilitate said upside down mechanical attachment to the motherboard.

7. The computer system as set forth in claim 5, wherein the second upside down L-shaped main body including the augmented mounting steps in conjunction with the motherboard define an exterior cavity having a height sufficient to accommodate a predetermined number of components attached to the motherboard.

8. The computer system as set forth in claim 5, wherein the add-on card connector is a PCI add-on card connector, and the add-on card comprises a PCI agent that is to be electrically located within a predetermined distance from the motherboard to be connected to a PCI bus disposed on the motherboard.

9. A method for forming a computer system, comprising:

a) attaching a bottom end of a right angle processor connector to a motherboard in a direction orthogonal to the motherboard;

b) attaching a processor package at an outward end of the right angle processor connector with the processor package and motherboard occupying parallel planes; and c) attaching a support member that is independent of the processor connector and having bracing features, at an opposite end of the processor package that is away from the processor connector by a predetermined distance to allow the bracing features of the support member to cooperate with like bracing features of the right angle processor connector to support and secure the processor package.

* * * * *

UNITED STATES PATENT AND TRADEMARK OFFICE

CERTIFICATE OF CORRECTION

PATENT NO. : 5,978,873
DATED : November 2, 1999
INVENTOR(S) : Phan

It is certified that error appears in the above-identified patent and that said Letters Patent is hereby corrected as shown below:

Column 2,
Line 57, after "accordance", insert -- with --.
Line 61, before "present", insert -- the --.

Signed and Sealed this

Twenty-second Day of April, 2003

JAMES E. ROGAN
*Director of the United States Patent and Trademark Office*